Figure 1:
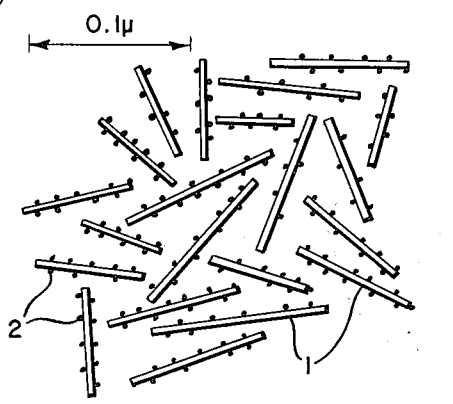

INVENTOR
JOHN BUGOSH

United States Patent Office 3,141,786
Patented July 21, 1964

3,141,786
FIBROUS BOEHMITE ALUMINA MOLDING POWDER AND PROCESSES FOR MOLDING THEM INTO DENSE, ALPHA ALUMINA ARTICLES
John Bugosh, Brandywine Hundred, Del., assignor to E. I. du Pont de Nemours and Company, Wilmington, Del., a corporation of Delaware
Filed June 15, 1961, Ser. No. 117,216
6 Claims. (Cl. 106—62)

This invention relates to high-purity alumina molding powders especially adapted for pressing into shaped objects which can be fired to extremely dense, strong and wear-resistant articles, and further relates to processes for pressing and firing high-surface-area aluminas to form such articles and to the shaped articles so produced.

More particularly the invention is concerned with molding powders consisting essentially of an intimate mixture of pulverulent fibrous alumina monohydrate having the boehmite crystal lattice and made up of alumina fibrils having a surface area of 200 to 400 square meters per gram ($m.^2/g.$) and an average length of 25 to 1500 millimicrons, said alumina monohydrate being substantially free of non-volatile impurities, and about from 0.5 to 5% by weight, based on the alumina as $Al_2O_3$, of a grain growth inhibitor selected from the group consisting of nickel oxide, magnesium oxide, chromium oxide, cobalt oxide, magnesium fluoride, and compounds thermally decomposable in air to said oxides; is further concerned with processes wherein a particulate high-purity alumina containing less than 0.1% by weight of siliceous material calculated as $SiO_2$ and having a surface area greater than 3 square meters per gram is intimately mixed with a grain growth inhibitor of the said group and the mixture is pressed at 1000 to 6000 pounds per square inch (p.s.i.) at a temperature in the range of 1600 to 1800° C. for a time in the range of 5 to 60 minutes; and is still further concerned with the so-produced articles having a microcrystalline structure with an average alumina grain size of 3 to 6 microns, containing less than 0.1% by weight of siliceous material as $SiO_2$, and, in a preferred embodiment characterized by extreme strength and wear resistance, having a density upwards of 99.5% of theoretical density, the products of this embodiment being particularly adapted for fabricating into metal cutting tools.

This application is a continuation-in-part of my copending application Serial No. 47,564, now U.S. Patent 3,108,888, filed August 4, 1960, as a continuation-in-part of my then copending application Serial No. 856,213, filed November 30, 1959, and now abandoned.

In the drawings:

FIGURE 1 is a schematic representation of a molding powder consisting of fibrils of colloidal alumina monohydrate having the boehmite crystal lattice 1 containing an adsorbed source of magnesia 2 before the powder has been compacted. The scale of magnification is shown as a length corresponding to 0.1 micron.

Figure 2:
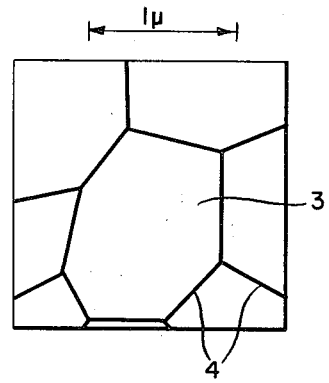

FIGURE 2 is a schematic representation of a polished and etched cross section of a dense ceramic made by compacting and sintering a powder of FIGURE 1 by hot-pressing. An alpha alumina crystal grain is shown at 3, the growth of the alpha crystal being inhibited by a spinel formed by reaction of magnesia with a portion of the alumina at the grain boundary 4, the scale of magnification showing a length corresponding to 1 micron.

Figure 3:
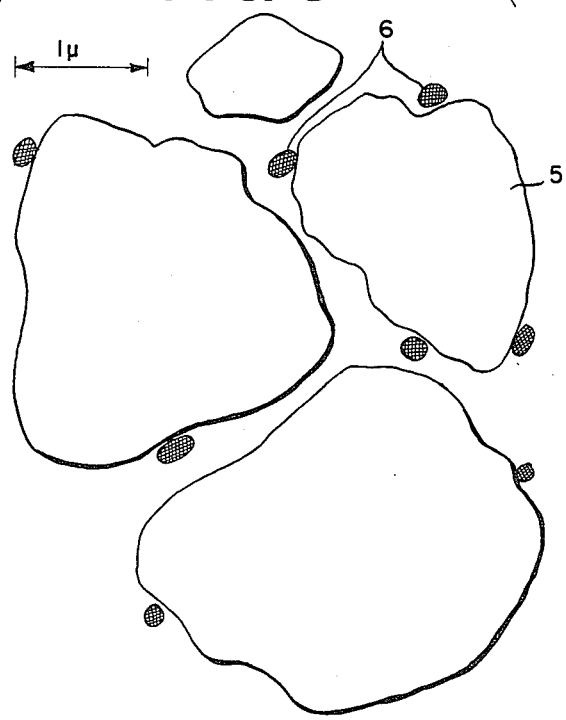

FIGURE 3 is a schematic representation of a coarse-particled molding powder not representative of the invention, showing the coarse alumina at 5 and coarse particles of magnesia 6 distributed sparsely therethrough. The scale shows a length corresponding to 1 micron.

Figure 4:
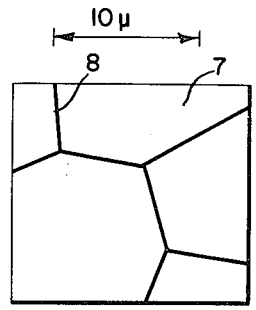

FIGURE 4 is a schematic representation of a polished and etched cross section of a dense ceramic body made from the coarse alumina powder of FIGURE 3, this again being a product not representative of the invention. Coarse grains of alpha alumina more than 10 microns in size are shown at 7, separated by a spinel at grain boundaries 8. The scale shows a length of 10 microns.

Figure 5:
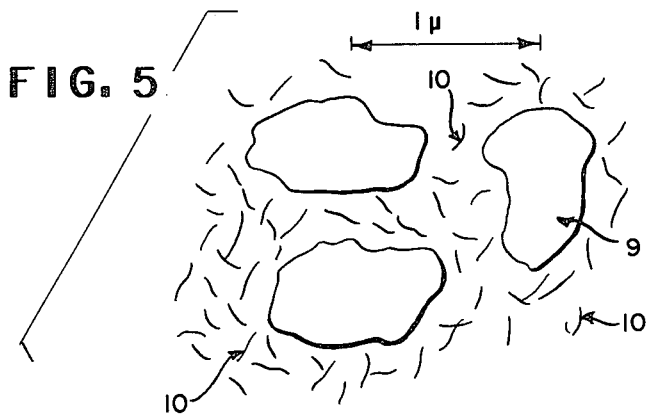

FIGURE 5 shows schematically a mixture of coarse alpha alumina powder having a grain size over 1 micron 9 mixed with fibril colloidal alumina containing a source of magnesium oxide 10 of the type shown in FIGURE 1.

Figure 6:
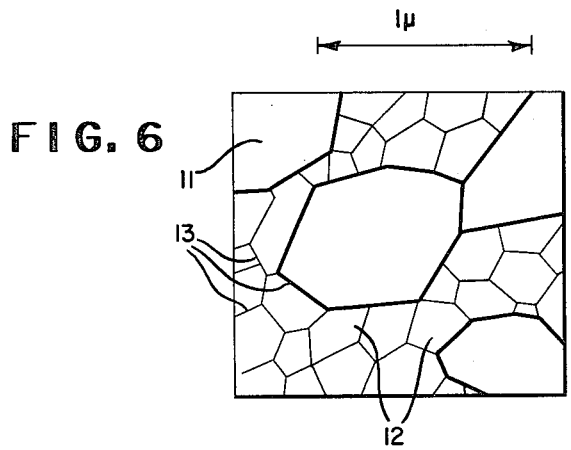

FIGURE 6 shows schematically a polished and etched section of a dense ceramic made from the composition of FIGURE 5, in which the coarse alpha grains 11 are still of about the same size, but are mixed with finer alpha crystals 12 the growth of which has been inhibited by a spinel derived from reaction of the alumina and magnesia at grain boundaries 13. In both FIGURES 5 and 6 the scale is shown at 1 micron.

Ordinarily, alumina is produced commercially in powdered form and the principal problem encountered when fabricating such powder into useful shaped objects is to obtain the desired density and strength without unwanted physical changes. In my prior applications, above mentioned, I have described the conversion of colloidal anisodiametric boehmite to anisodiametric transition aluminas, such as gamma alumina, and also alpha alumina, by heating. The present invention is particularly concerned with the aspect of said prior invention wherein grain growth of the products is inhibited by having present during heating a grain growth inhibitor selected from the group consisting of nickel oxide, magnesium oxide, chromium oxide, cobalt oxide, magnesium fluoride and compounds thermally decomposable in air to said oxides.

Techniques for making shaped objects from coarse powders of gamma and alpha alumina have already been worked out but the products have strengths and wear resistances lower than is desired. The times and temperatures used are such as to promote grain growth, so that the alumina grains are grown to a size of the order of 10 microns or larger if they were not already in that size range. The present invention is not concerned with products having such large grain size, but rather, is limited to products in which the average grain size is a maximum of 6 microns.

When it is sought to manufacture shaped articles from alumina powders in which the particle size of the alumina is very small the problem of controlling the grain growth becomes particularly difficult. Difficulty is encountered with particles of surface area greater than 3 square meters per gram, and when the particles are of a size such that the surface area of the alumina is greater than about 50 $m.^2/g.$ the rate of growth is very rapid at temperatures heretofore used in sintering operations, and at 200 $m.^2/g.$ the growth rate becomes catastrophic. The mere admixture of magnesia powder with the alumina powder to serve as an inhibitor does not give satisfactory results when the alumina surface area is greater than 3 $m.^2/g.$, and when this surface area of the alumina is over about 200 $m.^2/g.$ the results are completely unsatisfactory.

When it is desired to produce articles having the maximum possible density the above-mentioned problems are again magnified. If the powders are highly compressed and then sintered until the porosity is removed, it is found that grain growth has occurred to such an extent as to make the grains larger than about 10 microns and impair the strength of the densified object. On the other hand, maximum strength cannot be achieved unless all porosity is removed. Sintering promoters, such as manganese oxide, iron oxide, copper oxide and titanium dioxide, can be added, or can be present as impurities, and these will increase the rate at which maximum density is achieved;

but unfortunately they also accelerate the rate of grain growth and lower the strength and hardness of the final shaped object. Silica-containing materials also act as sintering promoters, but are particularly to be avoided, even in amounts as small as 0.1%. Avoidance of the presence of siliceous materials is especially difficult because it is a common impurity in the raw materials.

Substances which can be burned out during the sintering of the alumina objects are often included in alumina molding powders to aid in forming the powder compacts and give the shaped article a higher "green" strength. Unfortunately, the burning out of these additives leaves pores in the product. Elimination of these pores requires prolonged heating at temperatures at which grain growth can occur. Accordingly, molding powders which require such additions cannot lead to completely satisfactory products.

Now according to the present invention it has been found that the above-mentioned difficulties can be avoided and shaped articles of very fine grain size and exceptional strength and wear resistance can be produced by intimately mixing a particulate alumina having a surface area greater than 3 m.$^2$/g. with a grain growth inhibitor selected from the group consisting of nickel oxide, magnesium oxide, chromium oxide, cobalt oxide, magnesium fluoride, and compounds decomposable in air to said oxides, and pressing the mixture at 1000 to 6000 p.s.i. at a temperature in the range of 1600 to 1800° C. for a time in the range of 5 to 60 minutes. It has further been found that alumina articles of maximum strength and wear resistance are obtained when the particulate alumina used in the process is a pulverulent fibrous alumina monohydrate having the boehmite crystal lattice, made up of alumina fibrils having a surface area of 200 to 400 square meters per gram and an average length of 25 to 1500 millimicrons, and being substantially free of nonvolatile impurities, and the grain growth inhibitor is present therewith in the proportion of about from 0.5 to 5% by weight, based on the alumina as $Al_2O_3$. It has further been found that the novel shaped articles produced by said processes are characterized by having a microcrystalline structure with an average alumina grain size of 3 to 6 microns even after sintering to a density upwards of 99.5% of theoretical density, and that such articles are particularly useful as metal cutting tools.

THE ALUMINA STARTING MATERIAL

The alumina used as a starting material in processes of this invention must be particulate and the particles must be sufficiently small that the surface area of the alumina, as determined by such methods as nitrogen adsorption, exceeds about 3 m.$^2$/g. Preferably the particles are submicron in size; however, if the particles are fibrous, one dimension can exceed 1 micron. In any event, the average of the three dimensions of the particle must be less than 1 micron.

Ordinarily, it is impracticable to reduce relatively massive pieces of alumina to the desired submicron size by such methods as grinding. It is far more practicable to produce the alumina in finely divided form as part of the process of making it. Gamma alumina in the form of particles smaller than about 1 micron is commercially available from pyrolytic methods of production and is suitable for use in the processes of the present invention.

Particularly preferred as a source of alumina is a pulverulent fibrous alumina monohydrate having the boehmite crystal lattice as described in Bogush U.S. Patent 2,915,475. This alumina is in the form of fibrils having a surface area of 200 to 400 m.$^2$/g. and an average length of 25 to 1500 millimicrons. The alumina is of very high purity except for some acetate and sulfate which are volatile at temperatures well below temperatures of sintering, and hence do not interfere with the production of the desired sintered products. This fibrous boehmite gives molding powders especially adapted to use in the processes of this invention. When it is used, an orientation, discernible by X-ray diffraction, may persist into the final molded and densified product. The water of hydration is evolved at temperatures below the sintering temperatures without loss of the fibrous structure, giving intermediate product as fibrous gamma alumina of essentially the same dimensions, which is also a particularly useful alumina in the novel processes.

Whatever the alumina selected as the starting material, it is important that it be substantially free of impurities which lower the sintering temperature. Such materials as silica, often add to promote sintering, are particularly to be avoided because they accelerate grain growth and thereby defeat one of the objectives of the invention. Anionic impurities are less objectionable. Impurities which at sintering temperatures are very volatile or readily oxidized out are similarly not objectionable. On the other hand, substantial amounts of inorganic binding agents, such as are often added as temporary binders to improve the molding qualities of the powder, are to be avoided because in burning them out pores are created which require unduly long heating at very high temperatures to remove.

GRAIN GROWTH INHIBITOR

In addition to the alumina, the other essential starting material in a process of this invention is a material which functions as an inhibitor for the growth of alpha alumina grains in the product. This inhibitor is selected from the group consisting of nickel oxide, magnesium oxide, chromium oxide, cobalt oxide, magnesium fluoride, and compounds thermally decomposable in air to said oxides. The manner in which these inhibitors function is not fully understood, but from the evidence it appears likely that they act to form a spinel at the boundaries around the alpha alumina grains and thereby interfere with coalescence of the original small grains into larger grains, as illustrated in the drawings. Whatever the explanation, it has been found that the named compounds function in the desired manner.

Compounds which are thermally decomposable to the named oxides are the corresponding metal acetates, formates, carbonates, hydroxides and the like, which, when heated to the temperatures involved in the sintering process, are readily converted to the corresponding metal oxides. For instance, magnesium acetate, magnesium formate, magnesium carbonate, magnesium hydroxide, and the corresponding nickel, chromium, and cobalt compounds can be used. Magnesium acetate is particularly well adapted for use in the processes, as will be described more fully below.

It is critically important to have the inhibitor distributed uniformly in the alumina in the processes of this invention. As will be seen by comparing FIGURES 1 and 2 with FIGURES 3 and 4 of the drawings, bearing in mind the difference in the scale of these drawings, it is essential that the inhibitor be uniformly dispersed with respect to the alumina. It will be evident that the difficulty of securing adequate distribution increases as the size of the alumina particles decreases. It has been found that when the surface area of the alumina is upwards of 3 m.$^2$/g. the problem of adequate distribution is difficult. With materials of surface area of more than 50 m.$^2$/g. the problem is aggravated and at 200 m.$^2$/g. is particularly critical. On the other hand, if the alumina particles are larger than the size corresponding to 3 m.$^2$/g., the difficulty of obtaining a uniform distribution of grain growth inhibitor is obviated; but the desired small alpha alumina grain size in the final product cannot be maintained, because the sintering period required to achieve the required density is too prolonged.

By starting with magnesia of very small particle size—say, less than 100 millimicrons—or the carbonate or hydroxide of magnesia, or the corresponding compounds of the other grain growth inhibitors, and intimately mixing the inhibitor with the alumina by such methods as wet or dry ball milling, it is possible to achieve a reasonably good dispersion of the inhibitor in and around the alumina particles. However, uniform distribution can be assured by starting with a solution of a soluble compound of the inhibitor, such as magnesium acetate or magnesium formate, suspending the alumina in this solution, drying the mixture, and heating to decompose the acetate or formate to the corresponding oxide. Because of the assurance of satisfactory results this method is preferred.

The amount of grain growth inhibitor should be about from 0.5 to 5% by weight based on the alumina calculated as $Al_2O_3$. These percentages have reference to the inhibitor as the metal oxide, so that when magnesium acetate is used, for instance, the percentage of inhibitor will be by weight as MgO. Lesser amounts than 0.5% give inadequate retardation of grain growth, whereas amounts larger than 5% either dilute the final product undesirably or form too large a proportion of spinel.

HOT-PRESSING THE MOLDING POWDERS

Having intimately mixed the grain growth inhibitor and the alumina, and, if necessary, drying and pulverizing the mixture, the molding powder thus obtained is shaped to the desired physical form by hot-pressing. This is done at a pressure of 1000 to 6000 p.s.i. Lower pressures are not ordinarily adequate to give the desired compaction and densification, whereas higher pressures, although they are operable, are usually unnecessary and are unduly destructive of the molds at the high temperatures involved.

The temperature of heating is in the range of 1600 to 1800° C. Temperatures below 1600° C. do not give an adequate rate of sintering, whereas temperatures in excess of 1800° C. lead to rapid grain growth so that the ultimate grains are larger than the desired 6 microns. The rate of heating to 1600° C. depends to some extent on the nature of the molding powder. If the alumina is already present as alpha alumina and the magnesia or other grain growth inhibitor is present as MgO or the corresponding other metal oxides, the heating cycle can be rather rapid. On the other hand, if the starting alumina is the fibrous monohydrate having the boehmite crystal lattice, and the inhibitor is added as a metal salt which must be decomposed, it is often advantageous to heat more slowly while the water of hydration of the alumina and the acetate or other anion of the inhibitor is being dissipated. Representative heating cycles will be evident from the specific examples given hereinafter.

The time of heating at a temperature of 1600 to 1800° C. is in the range of 5 to 60 minutes. It will be understood that the 60-minute maximum time is used with the lower (1600° C.) temperature and the 5-minute time is used with the maximum (1800° C.) temperature. At times longer than 60 minutes undesirable grain growth occurs despite the presence of the grain growth inhibitor, whereas times less than 5 minutes are ordinarily inadequate to produce the desired sintering and densification even at the maximum allowable temperatures.

It is found that the heating at sintering temperatures as above described gives densification of the product to upwards of 99.5% of the theoretical density of alpha alumina without causing grain growth of the alumina outside the desired average grain size of 3 to 6 microns.

THE SHAPED ARTICLES

The shaped articles have a microcrystalline structure. They are not transparent and ordinarily are not even translucent—most often, they are opaque. They contain the alpha alumina in the form of grains having an average size in the range of 3 to 6 microns. The dense porcelain-like bodies are useful in all applications where conventional high-strength porcelains are employed. They can be used particularly for purposes of electrical insulation as in power-line insulators and spark plugs. They can be employed as dinnerware and for chemical-processing equipment such as crucibles.

Preferred embodiments of the articles of the invention are characterized by having extreme strength and wear resistance. These products have a density upwards of 99.5% of theoretical density. Such alumina bodies are valuable for making cutting tools, nozzles for high-temperature jets, dies for working metals and all use where maximum strength at high temperature is required.

Cutting tools having cutting edges made up of the dense alpha alumina just described are a preferred aspect of the present invention. Such bits for cutting tools can be shaped substantially to the desired form in the processes above described. The desired cutting edge can be imparted by cutting the bit to the desired shape with a diamond saw. The bit can be embedded in a suitable support such as a drill or boring bar and used in accordance with conventional metal-cutting practices. The art is already familiar with the mechanical considerations entering into the use of alumina in cutting tools—see, for instance, "Ceramics for Cutting Purposes," by W. M. Wheildon, from Modern Materials, edited by Henry H. Hausner, Academic Press, 1960, pages 107 to 141.

It is found that alumina cutting tools made in accordance with the process of this invention are more durable at the highest metal-cutting rates currently employed with alumina bits hitherto available, and that the wear resistance is very substantially greater.

The invention will be better understood by reference to the following illustrative examples:

Example 1

A water-dispersible, colloidal fibrous boehmite was made by hydrolyzing basic aluminum diacetate in aqueous solution containing 4.5% $Al_2O_3$ in an autoclave at 160° C. for a period of 1 hour in the presence of an amount of ammonium sulfate corresponding to 1.25 moles of ammonium sulfate per 100 gram atoms of aluminum, the colloidal alumina so formed being then spray-dried, yielding a powder which is spontaneously dispersed with water to form a colloidal solution of fibrous boehmite.

This colloidally dispersible boehmite alumina powder contains 67.8% $Al_2O_3$, 13.4% by weight of chemically bound acetic acid, and has a specific surface area of 253 m.$^2$/g., as determined by the Brunauer, Emmett and Teller method. When dispersed in water at a concentration of 1%, 92% of the alumina remains in the sol in colloidal form, and does not settle out after prolonged standing.

One hundred grams of this fibrous boehmite alumina powder is dispersed in 735 milliliters of water, and 4.4 grams of magnesium acetate tetrahydrate dissolved in 50 milliliters of water is added slowly while the mixture is stirred in a Waring blender. During this addition a total of 600 milliliters of water was added periodically to maintain a fluid mixture. After these additions, stirring is continued in the blender for one hour. The dispersion is then frozen quickly with a Dry Ice-acetone mixture while stirring with a magnetic stirrer. The solidified mass is freeze-dried overnight in a vacuum to produce an alumina molding powder of the invention.

Example 2

This is an additional example of the preparation of a molding powder of the invention containing colloidal boehmite alumina powder, with magnesium oxide to inhibit grain growth.

Three grams of magnesium acetate tetrahydrate is dissolved in 735 milliliters of water, and 100 grams of fibrous boehmite alumina powder of the type described in Example 1 is added slowly while the solution is stirred in a Waring blender. After the boehmite powder is added, the fluid mixture is stirred for one hour in the blender. The mixture is then drum-dried by feeding slowly to the nip of a double drum-dryer having six-inch-diameter rolls. The roll clearance is two mils, and the roll speed is 2 r.p.m. The surface temperature of the rolls is 263° F. The drum-dried powder is screened through a 20-mesh sieve, to remove any very large agglomerates. The resulting powder is a molding powder of this invention.

This powder is ground with mortar and pestle to disintegrate any very large agglomerates and is screened through a 45-mesh sieve. The powder contains 80% by weight of $Al_2O_3$ and 1% MgO on the basis of $Al_2O_3$. Silica and sodium contained is no more than 0.3% and 0.07% by weight of alumina, respectively. The specific surface area of the powder is 275 m.$^2$/g.

*Example 3*

This is another example of the preparation of an alumina molding powder from colloidal boehmite alumina powder containing approximately 2% magnesium oxide to inhibit grain growth.

One hundred grams of fibrous boehmite alumina powder of the type described in Example 1 is dispersed in 3000 milliliters of water using a large Waring blender to provide the necessary agitation. Eight and eight-tenths grams of magnesium acetate tetrahydrate dissolved in 50 milliliters of water is added slowly while the mixture is stirring. Blending is continued for 30 minutes after the addition of magnesium acetate. This slurry is spray-dried in 15.5-inch-diameter spray-dryer, 7 feet long. This dryer is equipped with a pneumatic spray nozzle and operated with an inlet air temperature of 300° C. and an outlet temperature of about 110° C. The fine, dry powder is collected in a cyclone.

*Example 4*

This is an example of the preparation of an alumina molding powder from colloidal boehmite alumina powder and approximately 2% cobalt oxide to inhibit grain growth.

Fifty-eight grams of fibrous boehmite alumina of the type described in Example 1 is dispersed in about 1150 milliliters of water, in a large Waring blender. Three and three-tenths grams of cobaltous acetate tetrahydrate is dissolved in 100 milliliters of distilled water and this solution is added dropwise to the colloidal boehmite suspension using continuous blending. After the final increment of the cobaltous acetate solution has been added, stirring is continued for an additional 30 minutes. This suspension is then drum-dried as described in Example 2. The resulting powder is a molding powder of the present invention.

*Example 5*

This is an example of the preparation of an alumina molding powder from colloidal boehmite alumina powder approximately 5% chromic oxide to inhibit grain growth.

Ninety grams of fibrous boehmite alumina powder of the type described in Example 1 is dispersed in 2000 milliliters of water, and 16.2 grams of chromic acetate monohydrate dissolved in 100 milliliters of water is added dropwise. The mixture is stirred in a laboratory blender during addition, and stirring is continued for 30 minutes, after the addition is completed. An additional 2000 milliliters of water is added, and the dispersion is spray-dried as described in Example 3 to obtain a molding powder.

*Example 6*

This is an example of the preparation of an alumina molding powder from colloidal boehmite alumina powder and about 4% nickel oxide to inhibit grain growth.

Ninety-six grams of fibrous boehmite alumina powder of the type described in Example 1 is dispersed in 2000 milliliters of water in a laboratory blender, and 13.3 grams of nickel acetate tetrahydrate dissolved in 100 milliliters of water is added slowly. The mixture is stirred in a laboratory blender during addition, and blending is continued for 30 minutes, following the addition of the nickel acetate solution. The resulting mixture is drum-dried as described in Example 2. A dry molding powder is obtained.

*Example 7*

This is an example of the preparation of a drum-dried colloidal boehmite alumina molding powder containing 5% of chromium oxide on the basis of $Al_2O_3$.

One hundred and thirty grams of fibrous boehmite alumina powder of the type described in Example 1, containing 95 grams of $Al_2O_3$, are dispersed in 3000 milliliters of water, and 330 milliliters of chromous acetate solution containing 1.08 grams Cr per 100 milliliters are added while stirring in a laboratory blender. Stirring is continued for 30 minutes after the addition is completed. The dispersion is then drum-dried as described in Example 2.

The resulting powder is ground and screened through a 40-mesh sieve.

*Example 8*

This is an example of the preparation of a colloidal boehmite alumina molding powder containing only 2% by weight of nickel oxide, on the basis of $Al_2O_3$, as an additive.

One hundred and twenty grams of fibrous boehmite alumina powder of the type described in Example 1 and containing 98% by weight of $Al_2O_3$ are dispersed in 2000 milliliters of water in a laboratory blender and 13.3 grams of nickel acetate tetrahydrate dissolved in 100 milliliters of water are added slowly. The mixture is stirred in a laboratory blender during addition and blending is continued for 30 minutes following the addition of the nickel acetate solution. The mixture is drum-dried as described in Example 2.

*Example 9*

This is an example of magnesia-modified colloidal gamma-alumina molding powder derived from fibrillar boehmite alumina.

A 50-gram portion of the magnesia-modified alumina powder obtained as described in Example 1 is heated in air at 500° C. for 10 hours. The resulting powder consists of high-surface-area gamma alumina containing 1% by weight of MgO. The specific surface area is 275 m.$^2$/g.

*Example 10*

This is an example of the preparation of dense, strong, fine-grained high alumina bars by hot-pressing a magnesia-modified fibrous boehmite alumina molding powder.

Ten grams of the powder obtained as described in Example 1 is pre-compacted in a 2-inch-diameter steel die under a pressure of 13,000 p.s.i., forming a coherent wafer. This densified material is reground in a mortar and the resulting powder is loaded into a 2″ x ¼″ x ¼″ graphite mold. The powder is pressed at 1000 p.s.i. at room temperature. After movement of the plunger has subsided, the powder is heated by induction to 1650° C. over a period of about 20 minutes. At this point the pressure is increased to 2000 p.s.i. and the temperature is raised from 1650 to 1800° C. This temperature is maintained for 5 minutes. At the end of this cycle pressure is released and the die is cooled to room temperature.

The strong alpha alumina bars which are obtained in this manner are coated with graphite and are polished and squared before testing. A commercial diamond wheel, resinoid bonded, 150 mesh, is used to clean and polish the surface of the specimen.

*Example 11*

A ten-gram portion of the powder obtained as described in Example 1 is hot-pressed as indicated in Example 10, using a maximum temperature of 1700° C. for 15 minutes.

The alpha alumina bars which are obtained in this manner are coated with graphite and are polished and squared before testing.

Example 12

A ten-gram portion of the powder obtained as described in Example 1 is hot-pressed as indicated in Example 10, using a maximum temperature of 1600° C. for 13 minutes.

The alpha alumina bars which are obtained in this manner are coated with graphite and are polished and squared before testing.

Example 13

This is an example of the preparation of dense, strong, uniformly fine-grained alumina chips for use in cutting tools by hot-pressing magnesia-modified fibrous boehmite alumina powder.

An 8-gram portion of the powder obtained as described in Example 1 is hot-pressed as indicated in Example 10, except that the mold is differently shaped.

The strong alpha alumina compacts which are obtained in this manner are polished into ½" x ½" x 3/16" chips. They fit into standard cutting tool holders and show superior wear resistance when the tools so prepared are used for cutting metal.

These compacts have a porosity of 0.01% and bulk density of 3.97 (American Society for Testing Materials, Method C20–46). Chemical analysis gives the following results:

CHEMICAL ANALYSIS

| | | |
|---|---|---|
| $Al_2O_3$ | percent | 98.5 |
| MgO | do | 1.00 |
| $SiO_2$ | do | 0.03 |
| C | do | 0.09 |
| N | do | 0.28 |
| Fe | do | 0.05 |
| Ni | p.p.m | 150–750 |
| Cr | p.p.m | 100–500 |
| Mn | p.p.m | 15–75 |
| Na | p.p.m | 150–750 |

A sharp, well-defined, predominantly alpha alumina matrix and the presence of small amounts of spinel (magnesium aluminate) are revealed by X-ray diffraction analysis.

Upon etching the surface of the sample with boiling $H_3PO_4$ (85% by weight) and taking an electron micrograph by using the well-known technique of shadow-casting, a uniform structure consisting of grains or crystals with an average size of 5 microns is observed.

The modulus of rupture, by transverse bend, of the compacts is around 80,000 p.s.i. At least 80% of this strength is retained if the body is quickly removed from a furnace at 1300° C. and cooled with a blast of room-temperature air.

The compressive strength at room temperature is 250,000 p.s.i.

Rockwell hardness (Ra) is 92.5 and shows a sharp indentation.

The coefficient of thermal expansion between 25° and 700° C. is $8 \times 10^{-6}$ inches/inch/° C.

The excellent mechanical and thermal characteristics of these bodies make them ideally suited for uses such as cutting tools. For instance, chips were properly machined and tested as metal cutting tool tips. Cutting tests were made under the following conditions:

(1) Material machined: A.I.S.I. 4340 steel.
(2) Coolant: none; depth of cut: .60"; feed (inches per revolution): .010; surface feet per minute: 2000.

The bits were operative for cutting the metal after runing for 45 minutes, a favorable ratio of 5 to 1 compared to commercial ceramic cutting tools. The surface finish was good and no tapering was exhibited on the cut sample. The cutting bit showed only small cratering after the test.

Example 14

This is an example of the preparation of dense, strong, fine-grained alumina compacts by hot-pressing magnesia-modified pyrolytic gamma alumina. The pyrolytic alumina is a high-surface-area powder (area greater than 50 m.²/g.) consisting of submicron, aggregated particles of gamma alumina produced in a rapid, high-temperature, vapor-phase flame process in a manner very similar to the formation of carbon black.

A 7-gram portion of this powder, containing 1% by weight of MgO on the basis of $Al_2O_3$, is hot-pressed as described in Example 10.

The strong alpha alumina compacts which are obtained in this manner are polished and squared.

Example 15

This is an example of the preparation of dense, strong, fine-grained, high alumina compacts by hot-pressing magnesia-modified pyrolytic alpha alumina. The pyrolytic alumina is in the form of a powder consisting of submicron aggregated in particles of alpha alumina produced by a thermal process.

A 7-gram portion of the powder, containing 1% by weight of MgO on the basis of $Al_2O_3$, is hot-pressed as described in Example 10.

The strong alpha alumina compacts which are obtained in this manner are polished and squared.

I claim:

1. A molding powder consisting essentially of an intimate mixture of pulverulent fibrous alumina monohydrate having the boehmite crystal lattice and made up of alumina fibrils having a surface area of 200 to 400 square meters per gram and an average length of 25 to 1500 millimicrons, said alumina being substantially free of nonvolatile impurities, and about from 0.5 to 5% by weight, based on the alumina as $Al_2O_3$, of a grain growth inhibitor selected from the group consisting of nickel oxide, magnesium oxide, chromium oxide, cobalt oxide, magnesium fluoride, and compounds thermally decomposable in air to said oxides.

2. A molding powder of claim 1 in which the grain growth inhibitor is magnesium acetate.

3. A molding powder of claim 1 in which the grain growth inhibitor is nickel acetate.

4. In a process for producing strong, wear-resistant articles of alpha alumina having an average grain size in the range of 3 to 6 microns the steps comprising intimately mixing (1) a pulverulent fibrous alumina monohydrate having the boehmite crystal lattice and made up of alumina fibrils containing less than 0.1% by weight of siliceous material calculated as $SiO_2$ and having a surface area of 200 to 400 square meters per gram and an average length of 25 to 1500 millimicrons, with (2) about from 0.5 to 5% by weight, based on the alumina as $Al_2O_3$, of a grain growth inhibitor selected from the group consisting of nickel oxide, magnesium oxide, chromium oxide, cobalt oxide, and compounds thermally decomposable in air to said oxides, heating the mixture in air to a temperature sufficient to convert said thermally decomposable compound to its oxide, and pressing the mixture at a pressure of 1000 to 6000 pounds per square inch and heating it while under said pressure at a temperature in the range of 1600 to 1800° C. for a time in the range of 5 to 60 minutes.

5. A process of claim 4 wherein the grain growth inhibitor is a magnesium salt thermally decomposable in air to magnesium oxide.

6. In a process for producing strong, wear-resistant articles of alpha alumina having an average grain size in the range of 3 to 6 microns the steps comprising mixing with an aqueous magnesium acetate solution a particulate, pulverulent, fibrous alumina monohydrate having the boehmite crystal lattice and made up of alumina fibrils having a surface area of 200 to 400 square meters per gram and an average length of 25 to 1500 millimicrons, said alumina monohydrate being substantially free of siliceous and other non-volatile impurities, the proportion of magnesium acetate being stoichiometrically equivalent to about from 0.5 to 5% by weight of MgO, drying the mixture, heating it to a temperature high enough to convert the magnesium acetate to magnesium oxide, and pressing the mixture at a pressure of 1000 to 6000 pounds per square inch and heating it while under said pressure at a temperature in the range of 1600 to 1800° C. for a time in the range of 5 to 60 minutes.

References Cited in the file of this patent

UNITED STATES PATENTS

| | | |
|---|---|---|
| 2,538,959 | Ballard | Jan. 23, 1951 |
| 2,618,567 | Comstock | Nov. 18, 1952 |
| 2,947,056 | Csordas et al. | Aug. 2, 1960 |